US008223865B2

(12) United States Patent
Bouzegzi et al.

(10) Patent No.: US 8,223,865 B2
(45) Date of Patent: Jul. 17, 2012

(54) METHOD FOR THE BLIND ESTIMATION OF OFDM SIGNAL PARAMETERS BY ADAPTED FILTERING

(75) Inventors: Abdelaziz Bouzegzi, Grenoble (FR); Pierre Jallon, Grenoble (FR); Philippe Ciblat, Paris (FR)

(73) Assignee: Commissariat a l'Energie Atomique et Aux Energies Alternatives, Paris (FR)

( * ) Notice: Subject to any disclaimer, the term of this patent is extended or adjusted under 35 U.S.C. 154(b) by 0 days.

(21) Appl. No.: 13/062,667

(22) PCT Filed: Sep. 14, 2009

(86) PCT No.: PCT/EP2009/061874
§ 371 (c)(1),
(2), (4) Date: Aug. 24, 2011

(87) PCT Pub. No.: WO2010/029173
PCT Pub. Date: Mar. 18, 2010

(65) Prior Publication Data
US 2011/0305302 A1    Dec. 15, 2011

(30) Foreign Application Priority Data

Sep. 15, 2008  (FR) .................................... 08 56197

(51) Int. Cl.
*H04K 1/10*    (2006.01)
*H04L 27/28*    (2006.01)
(52) U.S. Cl. ........................................ 375/260; 375/259
(58) Field of Classification Search .................. 375/260
See application file for complete search history.

(56) References Cited

U.S. PATENT DOCUMENTS

| 7,609,782 | B2 * | 10/2009 | Giannakis et al. | 375/299 |
| 8,014,472 | B1 * | 9/2011 | Lee et al. | 375/340 |
| 2005/0047515 | A1 | 3/2005 | Walton et al. | |
| 2009/0067318 | A1 * | 3/2009 | Kowalski | 370/208 |
| 2009/0143017 | A1 * | 6/2009 | Barak et al. | 455/65 |
| 2010/0290546 | A1 * | 11/2010 | Kowalski | 375/260 |
| 2011/0090980 | A1 * | 4/2011 | Okino | 375/267 |
| 2011/0164700 | A1 * | 7/2011 | Porat et al. | 375/267 |

OTHER PUBLICATIONS

Peng Liu et al: "A blind time-parameters estimation scheme for OFDM in multi-path channel", Wireless Communications, Networking and Mobile Computing, 2005 Proceedings, 2005 International Conference on Wuhan, China, Sep. 23-26, 2005, Piscataway, NJ, USA, IEEE, vol. 1, Sep. 23, 2005, pp. 222-227.

International Search Report and Written Opinion dated Nov. 30, 2009 for PCT Application No. PCT/EP2009/061874.

* cited by examiner

*Primary Examiner* — David C. Payne
*Assistant Examiner* — Erin File
(74) *Attorney, Agent, or Firm* — Knobbe Martens Olson & Bear LLP

(57) ABSTRACT

The present invention relates to a method for the blind estimation of at least one parameter of an OFDM signal by maximizing an objective function depending on said parameter. The objective function implements a parameterized model of the OFDM modulation and a matched filtering corresponding to that model. The OFDM signal, baseband demodulated and then sampled in an observation window, is the object of the adapted filtering to calculate the objective function.

It is also proposed to include, in the parameterized model, the temporal offset between the observation window and an OFDM symbol as well as the frequency offset between the frequency of the OFDM signal carrier and the baseband demodulation frequency.

12 Claims, 5 Drawing Sheets

METHOD FOR THE BLIND ESTIMATION OF OFDM SIGNAL PARAMETERS BY ADAPTED FILTERING

TECHNICAL FIELD

The present invention relates to a method for the blind estimation of OFDM (Orthogonal Frequency Division Multiplex) signal parameters.

BACKGROUND OF THE INVENTION

OFDM modulation is well known from the prior art and is used in many telecommunications systems, such as DVB-T, ADSL, Wi-Fi (IEEE 802 a/g), WiMax (IEEE 802.16). It has the advantage of good spectral responsivity and good protection from selective frequency fading.

It will be recalled that in an OFDM system, the information symbols to be transmitted are grouped by blocks of N symbols, where N is generally a power of 2, the OFDM symbols being obtained by performing an IFFT (Inverse Fast Fourier Transform) on said blocks of information symbols. Generally, a cyclic prefix is added to the beginning of each OFDM signal to absorb the inter-symbol interference (ISI) and facilitate equalization upon reception. The OFDM signal formed by these OFDM symbols may possibly be translated in frequency.

Generally, the signal transmitted by an OFDM system can be represented in baseband by:

$$s_a(t) = \frac{\sqrt{E}}{N} \sum_k g(t - k(N+D)T_c) \cdot \sum_{n=0}^{N-1} a_{k,n} e^{-2i\pi \frac{n}{NT_c}(t - DT_c - k(N+D)T_c)} \quad (1)$$

where E is the power of the signal, N is the number of carrier waves of the OFDM multiplex, $a_{k,n}$ are the information symbols relative to the block k, belonging to a modulation alphabet M-ary, typically BPSK, QPSK or QAM, $1/T_c$ is the throughput of the information symbols where $T_c$ is the "chip" time, D is the size of the cyclic prefix expressed in number of chips, g(t) is a forming impulsion for the OFDM signals having a temporal support $[0,(N+D)T_c]$ intended to apodize the spectrum of the signal.

Figure 1:
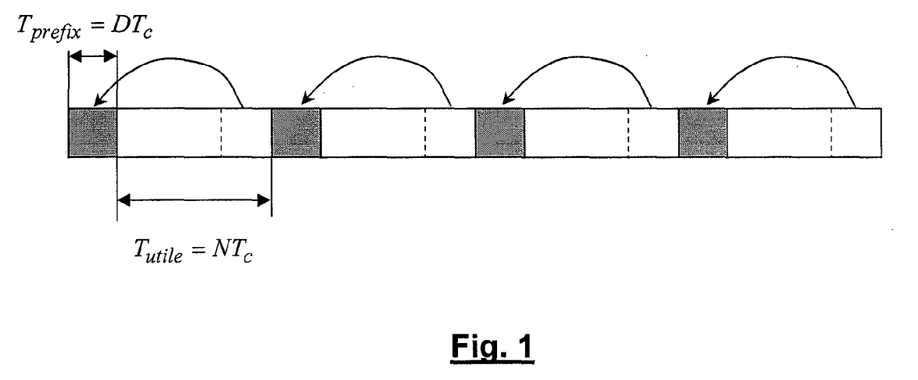
FIG. 1 diagrammatically illustrates an OFDM signal.

We have diagrammatically illustrated an OFDM signal in FIG. 1. It is made up of a sequence of OFDM symbols, each symbol having a total duration $(N+D)T_c$ including a useful duration $NT_c$ and a guard interval of duration $T_{prefix}=DT_c$, in which the cyclic prefix is located. It will be recalled that, traditionally, the cyclic prefix is a copy of the end of the OFDM symbol inside the guard interval. In certain OFDM systems, the cyclic prefixes are simply omitted, in other words the useful portions of the symbols are separated by "empty" guard intervals. This transmission technique also makes it possible to eliminate inter-symbol interference, but does not make equalization of the signal easy.

After propagation in the transmission channel, the OFDM signal received by the receiver can be expressed by:

$$y(t) = h \otimes s_a(t) + b(t) \quad (2)$$

where $h \otimes s_a$ is the convolution between the OFDM signal transmitted, $s_a(t)$ is the impulse response from the transmission channel h(t), and b(t) is a random function describing the noise. It will be assumed that the length of the impulse response is shorter than the length of the guard interval, so that it will be possible to neglect the inter-symbol interference (ISI).

Figure 2:
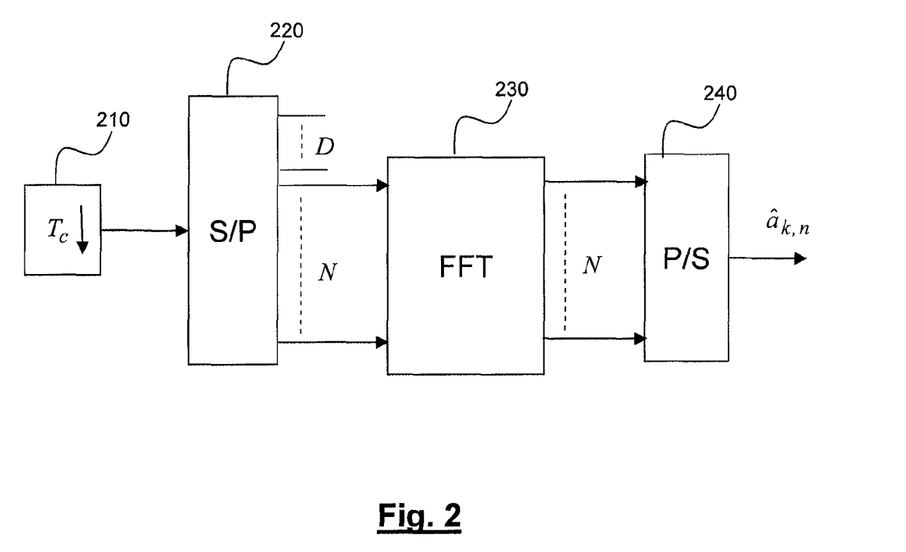
FIG. 2 diagrammatically illustrates an OFDM receiver known from the prior art.

FIG. 2 diagrammatically illustrates the structure of an OFDM receiver.

After possibly baseband demodulation, the received signal is sampled at 210 at the chip frequency, then the samples are subjected to a serial/parallel conversion at 220 to form blocks of N+D samples. The first D samples corresponding to the guard interval are rejected and the block of the N remaining samples corresponding to the useful portion of the OFDM symbol is subjected to a FFT at 230. The demodulated symbols obtained are then subjected to a serial conversion at 240.

Eventually, assuming that the receiver is well synchronized in time and frequency, the demodulated symbols can be expressed by:

$$\hat{a}_{k,n} = h_n a_{k,n} + b_{k,n} \quad (3)$$

where $h_n$ is a complex coefficient that depends on the impulse response of the transmission channel, and $b_{k,n}$ is a random variable representing a noise sample.

The proper operation of this receiver requires precise synchronization in time and frequency. Indeed, it is understood that a poor time synchronization will cause gradual temporal slipping of the truncation window, and a poor frequency synchronization will cause a phase rotation of the samples, which can be represented by a multiplicative factor $e^{2i\pi\Delta f n T_c}$ where $\Delta f$ is the frequency offset between the demodulation frequency of the receiver and the carrier frequency of the OFDM multiplex.

The temporal and frequency synchronization of the receiver is generally done owing to the acquisition of a learning sequence.

The operation of this detector assumes, of course, that the parameters of the transmitted OFDM signal are known (in other words, the parameters of the OFDM symbols). "Parameters of the OFDM signal" refers here to the number N of sub-carriers, the useful duration $NT_c$ of a symbol or, equivalently, the frequency spacing $1/NT_c$ between sub-carriers, the duration of the guard interval $DT_c$ and/or the repetition period $(N+D)T_c$ of said symbols.

Quite often, the receiver does not know a priori the parameters of the OFDM signal and it is necessary to estimate them blindly, before any demodulation.

Several methods have been proposed to that end. They exploit the presence of the cyclic prefix in the OFDM signal and the resulting cyclostationarity properties. The estimators for the parameters are based on the auto-correlation function of the OFDM signal. An example of such an estimating method can be found in the article by P. Liu et al. entitled "A blind time-parameters estimation scheme for OFDM in multi-path channel", published in Proc. 2005 Int'l Conference on Information, Communications and Signal Processing, vol. 1, pp. 242-247, 23-26 Sep. 2005.

These estimating methods, however, have the drawback of requiring the acquisition of a large number of OFDM symbols to calculate the auto-correlation function. Moreover, these methods do not work in the case, mentioned above, where the OFDM signal does not have cyclic prefixes. They do not work well or at all when the ratio between the prefix duration and the OFDM symbol duration, D/(D+N), is low. Indeed, in this case, the secondary peak of the auto-correlation function, due to the cyclostationarity of the signal, becomes blurred or even disappears in the noise. It is then impossible to precisely determine the gap between the main peak and the secondary peak that makes it possible to estimate the parameter $NT_c$.

The aim of the present invention is therefore to propose a method for the blind estimation of parameters of an OFDM signal that does not have the aforementioned drawbacks.

A secondary aim of the present invention is to allow temporal and frequency synchronization of the OFDM receiver that is fast and does not require a learning sequence.

BRIEF DESCRIPTION OF THE INVENTION

The present invention is defined by a method for the blind estimation of at least one parameter of an OFDM signal made up of a sequence of OFDM symbols, the OFDM signal being baseband demodulated, then sampled during an observation period.

According to a first embodiment, a vector y of the samples thus obtained is formed, and for a plurality of possible values of said parameter, a matrix $H_{\bar{\theta}}$ is built that is representative of an OFDM modulation used to generate said signal, said matrix depending on said parameter, and the value of an objective function $$J(\bar{\theta}) = \frac{\|H_{\bar{\theta}}^H y\|^2}{\|H_{\bar{\theta}} H_{\bar{\theta}}^H\|_F}$$

is calculated, where $\|.\|$ is the Euclidean norm, $\|.\|_F$ is the Frobenius norm, and lastly, said possible parameter value that achieves the maximum of the objective function is selected as the estimation of said parameter.

Said parameter is for example characteristic of the useful length of said OFDM symbols.

According to another example, the aforementioned method jointly estimates a set of parameters of the OFDM signal, the maximum of the objective function being sought for a set of respective possible values for said parameters, the set of said possible values achieving the maximum of the objective function yielding the respective estimated values of said parameters.

Said set of parameters can be made up of the number of sub-carriers of the OFDM multiplex, the useful length, and the prefix duration of said OFDM symbols.

According to a second embodiment, for a plurality of possible values of said parameter, a matrix is built that is representative of an OFDM modulation used to generate said signal, said matrix depending on the parameter and, for each possible value of the parameter, a plurality of possible values is tested for a temporal offset between the beginning of the observation period and the beginning of an OFDM symbol, by eliminating, for each possible value of the temporal offset, a corresponding number of first lines of said matrix and the same number of first elements of said vector to form a truncated matrix $\tilde{\theta}$ and a truncated vector y, the value of an objective function $$J(\tilde{\theta}) = \frac{\|H_{\tilde{\theta}}^H y\|^2}{\|H_{\tilde{\theta}} H_{\tilde{\theta}}^H\|_F}$$

is calculated, where $\|.\|$ is the Euclidean norm, $\|.\|_F$ is the Frobenius norm, and the pair of possible values of the parameter and the offset that achieve the maximum of the objective function are selected as the estimation of said parameter and the estimation of the temporal offset.

For example, said parameter is characteristic of the useful length of said OFDM symbols.

According to another example, the estimation method jointly estimates a set of parameters of the OFDM signal, the maximum of the objective function being sought for a set of respective possible values of these parameters and a value of the temporal offset, the set of said possible values of the parameters and the temporal offset achieving the maximum of the objective function yielding the respective estimated values of those parameters and that offset.

For example, said set of parameters is made up of the number of sub-carriers of the OFDM multiplex, the useful length, and the prefix duration of said OFDM symbols.

According to a third embodiment, a matrix is built that is representative of an OFDM modulation used to generate said signal, said matrix depending on said parameter as well as a frequency offset between the carrier of the OFDM signal and the frequency used to baseband demodulate and, for each possible value of the parameter, a plurality of possible values of said frequency offset are tested, and the value of an objective function $$J(\tilde{\theta}) = \frac{\|H_{\tilde{\theta}}^H y\|^2}{\|H_{\tilde{\theta}} H_{\tilde{\theta}}^H\|_F}$$

is calculated, where $\|.\|$ is the Euclidean norm, $\|.\|_F$ is the Frobenius norm, and the pair of possible values of the parameter and the offset that achieve the maximum of the objective function are selected as the estimation of said parameter and as the estimation of the frequency offset.

For example, said parameter is characteristic of the useful length of said OFDM symbols.

According to another example, said method jointly estimates a set of parameters of the OFDM signal, the maximum of the objective function being sought for a set of respective possible values of these parameters and a value of the frequency offset, the set of said possible values of the parameters and the frequency offset achieving the maximum of the objective function yielding the respective estimated values of those parameters and that offset.

Said set of parameters can in particular be made up of the number of sub-carriers of the OFDM multiplex, the useful length, and the prefix duration of said OFDM symbols.

BRIEF DESCRIPTION OF THE DRAWINGS

Other features and advantages of the invention will appear upon reading one preferred embodiment of the invention done in reference to the appended figures, in which.

DETAILED DESCRIPTION OF THE INVENTION

Below we will consider the case of a telecommunications system using an OFDM modulation. We will consider that the OFDM signal transmitted has the form given by expression (1) and that the OFDM symbols may or may not contain a prefix. For simplification, we will consider that they contain a prefix, but that it can be empty (D=0).

We will situate ourselves in the context of a blind estimation of at least one parameter of the OFDM signal, in particular an OFDM modulation parameter, such as the number of sub-carriers, the frequency spacing between these sub-carriers or, equivalently, the useful duration of the OFDM symbols. The set of parameters to be estimated is represented by a vector θ, for example θ=(N,DT$_c$,NT$_c$). In certain cases, this assembly can be reduced to a singleton. For example, the number N of carriers and the duration of the OFDM symbol T$_s$=(N+D)T$_c$ can be known, the parameter to be blindly estimated being the useful duration NT$_c$ or the spacing between sub-carriers 1/NT$_c$.

The signal received by the receiver can be expressed, after baseband demodulation and sampling at a frequency 1/T$_e$ greater than the Nyquist frequency 1/T$_c$, by:

$$y(m) = \sum_{l=0}^{L} \lambda_l s_a(m - \tau_l) + b(m) \quad (4)$$

where the $\lambda_l$ and $\tau_l$ are respectively the complex attenuation coefficients and the delays associated with the different paths of the channel expressed in numbers of samples, L is the total number of paths, and b(m)=b(mT$_e$) where b(t) is an additive white Gaussian noise.

Without loss of generality, but for the sake of simplification, we will hereinafter limit ourselves to the case of a single path channel. In that case, it can be shown that equation (4) is simplified:

$$y(m) = \quad (4')$$
$$\frac{1}{\sqrt{N}} \sum_{k=0}^{K-1} \sum_{n=0}^{N-1} a_{k,n} e^{-2i\pi \frac{n}{NT_c}(mT_e - DT_c - k(N+D)T_c)} g(mT_e - k(N+D)T_c) + b(m)$$

using for time reference the beginning of an OFDM signal. Equivalently, this equation can be expressed in matricial form $$y = H_\theta a + b \quad (5)$$

where y=(y(0), y(1), ..., y(M−1))$^T$, (.)$^T$ represents the transposition operation, M=⌊T$_0$/T$_e$⌋ where T$_0$ is the length of the observation window of the OFDM signal, and ⌊x⌋ is the largest integer less than or equal to x, a$_k$=(a$_{k,0}$, a$_{k,1}$, ..., a$_{k,M-1}$)$^T$ and a=(a$_0^T$, a$_1^T$, ..., a$_{K-1}^T$)$^T$ with K=⌈T$_0$/T$_s$⌉ and ⌈x⌉ is the smallest integer greater than or equal to x, b=(b(0), b(1), ..., b(M−1))$^T$. In other words, y is the size vector M made up of samples received in baseband, a is a size vector KN representative of the sequence of the KN modulation symbols a$_{k,n}$ modulating the sub-carriers n=0, ..., N−1 of the OFDM symbols k=0, ..., K−1 in the observation window, and b is the vector made up of the noise samples.

Generally, the matrix H$_\theta$ is representative of the channel and the OFDM modulation, this modulation being parameterized by a set θ of parameters, for example θ is the triplet θ=(N,DT$_c$,NT$_c$). We will use the case of a flat fading channel. The matrix H$_\theta$ is then only representative of the OFDM modulation. More precisely, if the forming function g(t) can be approximated by a window function, the elements of the matrix H$_\theta$ are null except for those defined to within a multiplicative factor by:

$$H_\theta(m, k_m N + n) = \frac{1}{\sqrt{N}} e^{-2i\pi nm \frac{T_e}{NT_c}} e^{2i\pi n(k_m+1)\frac{DT_c}{NT_c}} \quad (6)$$

where m=0, ..., M−1, n=0, ..., N−1 and where k$_m$ is the only integer verifying:

$$m\frac{T_e}{T_s} - 1 < k_m \le m\frac{T_e}{T_s} \quad (7)$$

Thus, the matrix H$_\theta$, with size M×KN, has a block structure, the size of each block being ⌊T$_s$/T$_e$⌋×N.

In the context of a blind estimation, the OFDM receiver simply knows the vectors y, each vector being made up of samples of the OFDM signal, baseband demodulated and taken into account during an observation window. The receiver naturally also knows the sampling frequency 1/T$_e$ used to sample the baseband OFDM signal and the width T$_0$ of the observation window.

The idea at the basis of the invention is to look for the matrix H$_{\bar\theta}^H$ having a form according to (6), i.e. whereof the non-null elements are given by:

$$H_{\bar\theta}(m, \bar k_m \bar N + n) = \frac{1}{\sqrt{\bar N}} e^{-2i\pi nm \frac{T_e}{\bar{NT_c}}} e^{2i\pi n(\bar k_m+1)\frac{\bar{DT_c}}{\bar{NT_c}}} \quad (8)$$

where $\bar N$, $\bar{NT_c}$, $\bar{DT_c}$ denote the values of the parameters resulting from $\bar\theta$, and that maximizes $\|H_{\bar\theta}^H y\|$ under a certain constraint, $\|x\|$ here representing the Euclidean norm of the vector x. This aim of this constraint is to normalize the matrix H$_{\bar\theta}$ within the meaning of a certain norm described below.

More precisely, it is proposed to use the following objective function:

$$J(\bar\theta) = \frac{E\{\|H_{\bar\theta}^H y\|^2\}}{\|H_{\bar\theta} H_{\bar\theta}^H\|_F} \quad (9)$$

where $\|A\|_F = \sqrt{Tr(A^H A)}$ is the Frobenius norm of the matrix A, Tr(.) designates the trace and E{.} here indicates the average value taken on the vectors y, i.e. on a sequence of observation windows.

In practice, however, unless the duration of the OFDM symbol T$_s$=(N+D)T$_c$ is known and an observation window T$_0$ that is a multiple of that duration is chosen, the consecutive observation windows do not start with a same delay relative to the beginning of an OFDM symbol and one settles for taking an instantaneous value at the numerator, or:

$$J(\bar\theta) = \frac{\|H_{\bar\theta}^H y\|^2}{\|H_{\bar\theta} H_{\bar\theta}^H\|_F} \quad (9')$$

It is possible to show that in the absence of noise, the objective function $J(\bar{\theta})$ has the following property:

$$J(\bar{\theta}) \leq J(\theta) = \|H_\theta H_\theta^H\|_F \qquad (10)$$

where $H_\theta$ is the matrix according to expression (6) used by the OFDM transmitter, i.e. corresponding to the parameters $\theta$ of the OFDM signal effectively transmitted.

The proof of property (10) is obtained by considering that the symbols $a_{k,n}$ are random independent variables identically distributed. Under these conditions, the covariance matrix of a is $E\{aa^H\} = I_{KN}$ where $E\{.\}$ here means the average value over the symbols $a_{k,n}$ and $I_{KN}$ is the unit matrix with size $KN \times KN$. We then have:

$$E\{\|H_{\bar{\theta}}^H y\|^2\} = Tr(H_{\bar{\theta}}^H H_\theta H_\theta^H H_{\bar{\theta}}) \qquad (11)$$

It will be recalled that, in this expression, $\theta$ corresponds to the parameters of the transmitted OFDM signal and $\bar{\theta}$ to the tested parameters.

Property (10) results from the following inequality, corollary of the Cauchy-Schwarz inequality applied to the Frobenius norm for any two matrices A and B:

$$\|A^H B\|_F^2 \leq \|A^H A\|_F \|B^H B\|_F \qquad (12)$$

Indeed, by applying (12) to the matrices $A = H_{\bar{\theta}} H_{\bar{\theta}}^H$ and $B = H_\theta H_\theta^H$ and in light of (11), we have:

$$E\{\|H_{\bar{\theta}}^H y\|^2\} \leq \|H_{\bar{\theta}} H_{\bar{\theta}}^H\|_F \|H_\theta H_\theta^H\|_F \qquad (13)$$

the inequality only being achieved if $H_{\bar{\theta}} H_{\bar{\theta}}^H = H_\theta H_\theta^H$. Due to the form of the matrices $H_{\bar{\theta}}$, this equality is itself only verified if $\theta = \bar{\theta}$.

Eventually, according to the first embodiment of the invention, the estimation $\hat{\theta}$ is given by:

$$\hat{\theta} = \underset{\bar{\theta}}{\mathrm{argmax}}(J(\bar{\theta})) \qquad (14)$$

Figure 3:
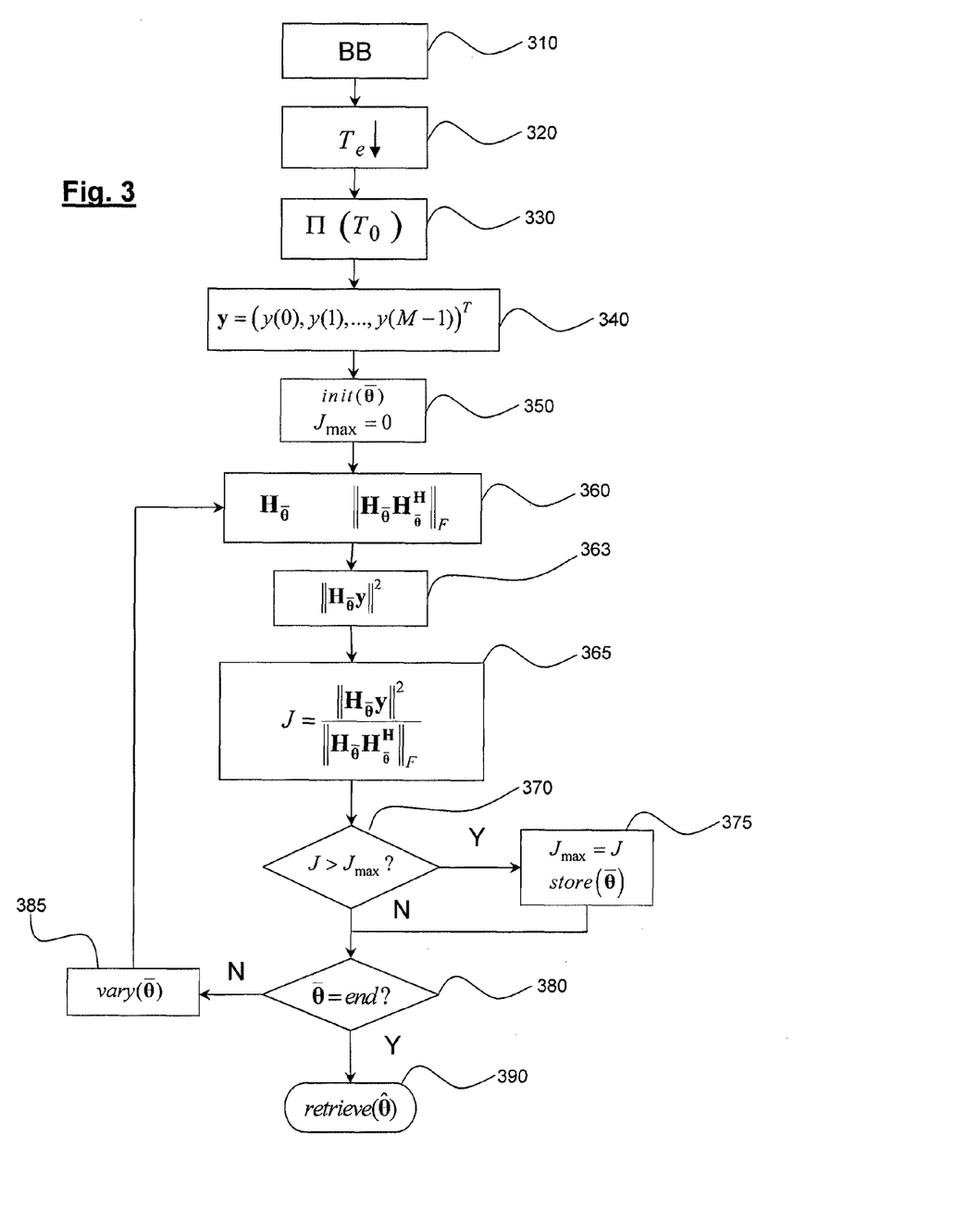
FIG. 3 is a flowchart of a method for estimating parameters of an OFDM signal according to a first embodiment of the invention.

FIG. 3 diagrammatically illustrates the flowchart of a method for estimating at least one OFDM signal parameter according to a first embodiment of the invention.

In step 310, the OFDM signal is baseband demodulated, then sampled at 320 at a frequency $1/T_e$ greater than the Nyquist frequency. The order of magnitude of $1/T_c$ is generally known, in other words the bandwidth of the OFDM signal, which makes it possible to choose the sampling frequency accordingly.

In step 330, a block of M complex samples is chosen corresponding to an observation window with a given width $T_0$. If the duration $T_s$ of the OFDM symbol is known, this width is advantageously chosen as a multiple of $T_s$.

In 340, the vector y is built from the M complex samples.

In step 350, the parameters to be tested $\bar{\theta}$ are initialized, as well as the value $J_{max}$, for example $J_{max} = 0$.

An iterative loop is then entered in which the parameters to be tested $\bar{\theta}$ are made to vary in a predetermined range.

In 360 the matrix $H_{\bar{\theta}}$ is calculated from expression (8), the values participating in that expression being, depending on the case, either known by the receiver or provided by $\bar{\theta}$. The Frobenius norm of the matrix $H_{\bar{\theta}} H_{\bar{\theta}}^H$ is then calculated.

In step 363, the Euclidean norm of the vector $H_{\bar{\theta}}^H y$ is then calculated.

In step 365, the value $\|H_{\bar{\theta}}^H y\|^2$ is calculated, then the value J taken by the objective function, or $$J = \frac{\|H_{\bar{\theta}}^H y\|^2}{\|H_{\bar{\theta}} H_{\bar{\theta}}^H\|_F}.$$

In step 370, one tests whether the value thus obtained is greater than $J_{max}$. In the affirmative, in 375 the value $J_{max}$ is updated with the value J and the tested parameters $\bar{\theta}$ are stored in memory.

One then tests, in 380, whether the entire range of parameters has been run through and if not, $\bar{\theta}$ is made to vary, for example by incrementation, and one returns to the calculation step 360.

The estimated value $\hat{\tau}$ of the parameters is read in the memory in step 390.

The preceding estimation method yields good results when the beginning of the observation window coincides with the beginning of the OFDM symbol. However, as a general rule, the observation window is not synchronized on an OFDM symbol, but has an offset $\tau$ on the beginning of such a symbol.

In that case, the received OFDM signal can be expressed as:

$$\tilde{y}(m) = y(m - \tau_e) \qquad (15)$$

where $y(m)$ is given by expression (4') and $$\tau_e = \left\lfloor \frac{\tau}{T_e} \right\rfloor$$

is the offset labeled in number of sampling periods.

In order to process the presence of this temporal offset, the set of parameters $\bar{\theta}$ is increased by the offset $\tau$, the set thus increased being noted $\tilde{\theta} = \bar{\theta} \cup \{\tau\}$ and a new matrix $H_{\tilde{\theta}}$ is defined obtained from $H_{\bar{\theta}}$ by eliminating the $\tau_e$ first lines of said matrix. The matrix $H_{\tilde{\theta}}$ is then a matrix with size $(M - \tau_e) \times \overline{KN}$ where $\overline{N}$ is the number of sub-carriers provided by $\theta$ and $\overline{K} = \lfloor T_0/(\overline{NT_c} + \overline{DT_c}) \rfloor$. Likewise, the $\tau_e$ first samples of the observation window will not be taken into consideration in calculating the cost function.

Similarly to (9'), an extended objective function $J(\tilde{\theta})$ can be built that takes into account the offset $\tau_e$, or:

$$J(\tilde{\theta}) = \frac{\|H_{\tilde{\theta}}^H y\|^2}{\|H_{\tilde{\theta}} H_{\tilde{\theta}}^H\|_F} \qquad (16)$$

One will make sure that in expression (16), the size of the vector y depends on $\tau_e$ since the $\tau_e$ first samples are eliminated.

It can be shown that $J(\tilde{\theta}) \leq J(\theta) = \|H_\theta H_\theta^H\|_F$ and that the equality is only achieved if the parameters of the OFDM signal are correctly estimated and if the OFDM signal is correctly synchronized, in other words if the value of $\tau_e$ is also correct.

Figure 4:
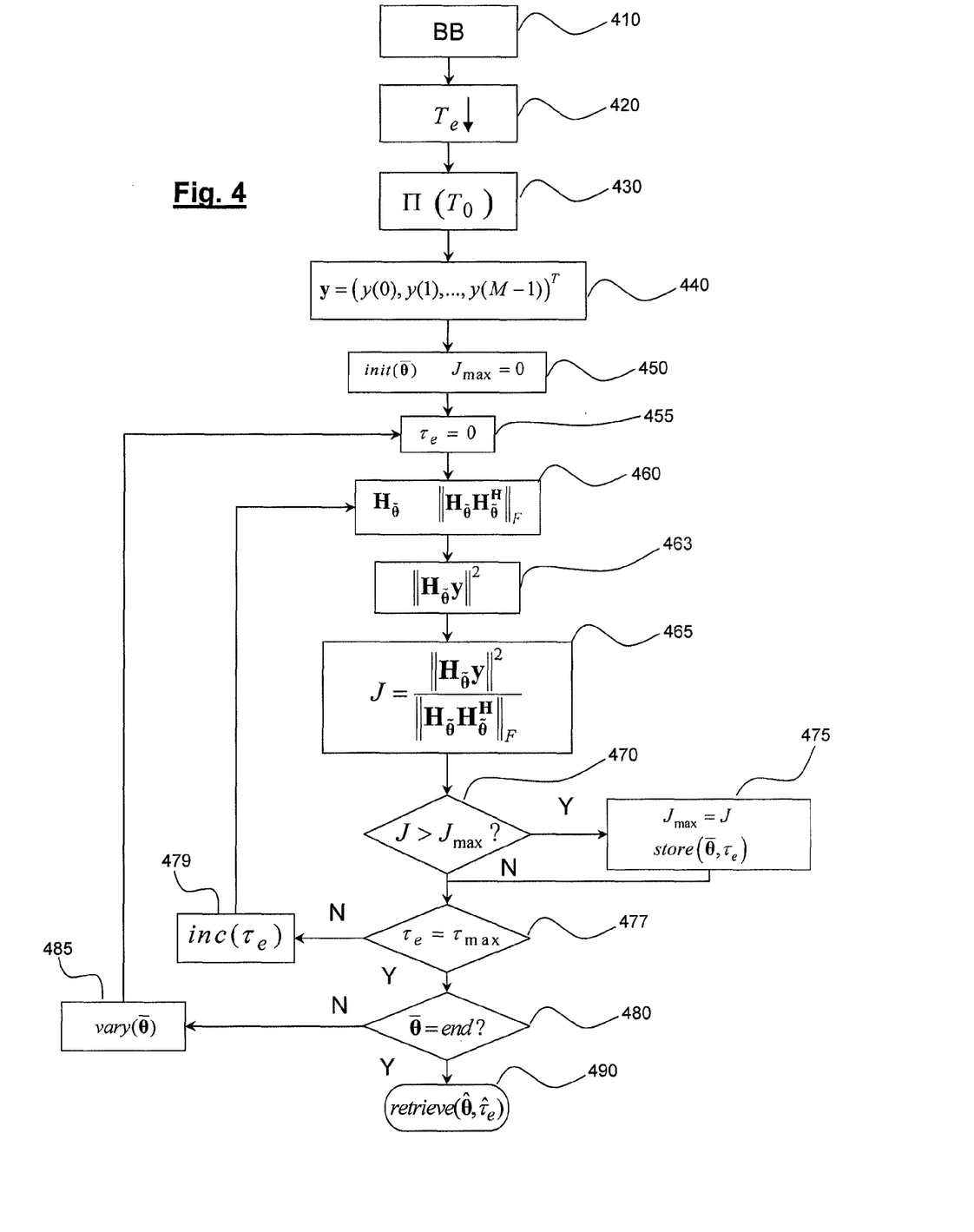
FIG. 4 is a flowchart of a method for estimating parameters of an OFDM signal according to a second embodiment of the invention.

FIG. 4 diagrammatically illustrates a method for estimating the OFDM parameter according to a second embodiment of the invention.

Steps 410 to 450 are identical to steps 310 to 350 of FIG. 3 and will therefore not be described again.

In step 455, the offset value $\tau_e$ is initialized, for example at zero.

In step 460, the matrix $H_{\bar{\theta}}$ is calculated, then the matrix $H_{\tilde{\theta}}$ is deduced therefrom by eliminating the $\tau_e$ first lines. The Frobenius norm of $H_{\tilde{\theta}} H_{\tilde{\theta}}^H$ is then calculated.

In step 463, the Euclidean norm $\|H_{\check\theta}y\|^2$ is calculated.

Then in 465 the value J of the objective function is calculated from expression (16).

As before, if the value of J is greater than the current value $J_{max}$, $J_{max}$ is updated to value J. The parameters $\bar\theta$ and the corresponding offset $\tau_e$ are stored in memory.

In 477 one tests whether $\tau_e$ has reached its maximum value $\tau_{max}$ and if not, it is incremented to return to matricial calculation step 460. In the affirmative, in 480 one tests whether the entire range of parameters has been gone through. In the negative, the parameters $\bar\theta$ are modified in 485 and one returns to step 455 for a new initialization of the offset.

However, if the range has been completely gone through, one finishes with 490 by reading the offset $\tau_e$ and the corresponding parameters $\bar\theta$ in memory. These values respectively yield the estimation $\hat\tau_e$ of the offset and the estimation $\hat\theta$ of the parameters.

The preceding estimation method yields good results when the baseband demodulator of the OFDM receiver is well calibrated on the RF carrier. Failing this, a frequency offset Δf appears between the receiver and the transmitter, which can introduce an estimation error.

In order to eliminate this source of error, the set of parameters $\bar\theta$ is increased by the normalized frequency offset $\delta f = \Delta f . T_c$, the set thus increased being denoted $\check\theta = \bar\theta \cup \{\delta f\}$, and a new matrix $H_{\check\theta}$ is defined taking into account the phase rotations due to this frequency offset, or:

$$H_{\check\theta}(m, k_m\bar N + n) = \frac{1}{\sqrt{\bar N}} e^{-2i\pi m T_e \frac{n+\delta f}{\bar N T_c}} e^{2i\pi n(\bar k_m + 1)\frac{\overline{DT_c}}{\bar N T_c}} \quad (17)$$

where it is recalled that $\bar N$, $\overline{NT_c}$, $\overline{DT_c}$ are the values resulting from $\bar\theta$.

Similarly to (9'), it is possible to build an extended objective function $J(\check\theta)$ that takes the frequency offset into account, or:

$$J(\check\theta) = \frac{\|H_{\check\theta}^H y\|^2}{\|H_{\check\theta} H_{\check\theta}^H\|_F} \quad (18)$$

It can be shown, as before, that $J(\check\theta) \leq J(\theta) = \|H_\theta H_\theta^H\|_F$ and that the equality is only achieved if the parameters of the OFDM signal are correctly estimated and if the frequency offset is also correct, i.e. if it corresponds to the actual difference between the frequency of the carrier used for transmission and the demodulation frequency.

Figure 5:
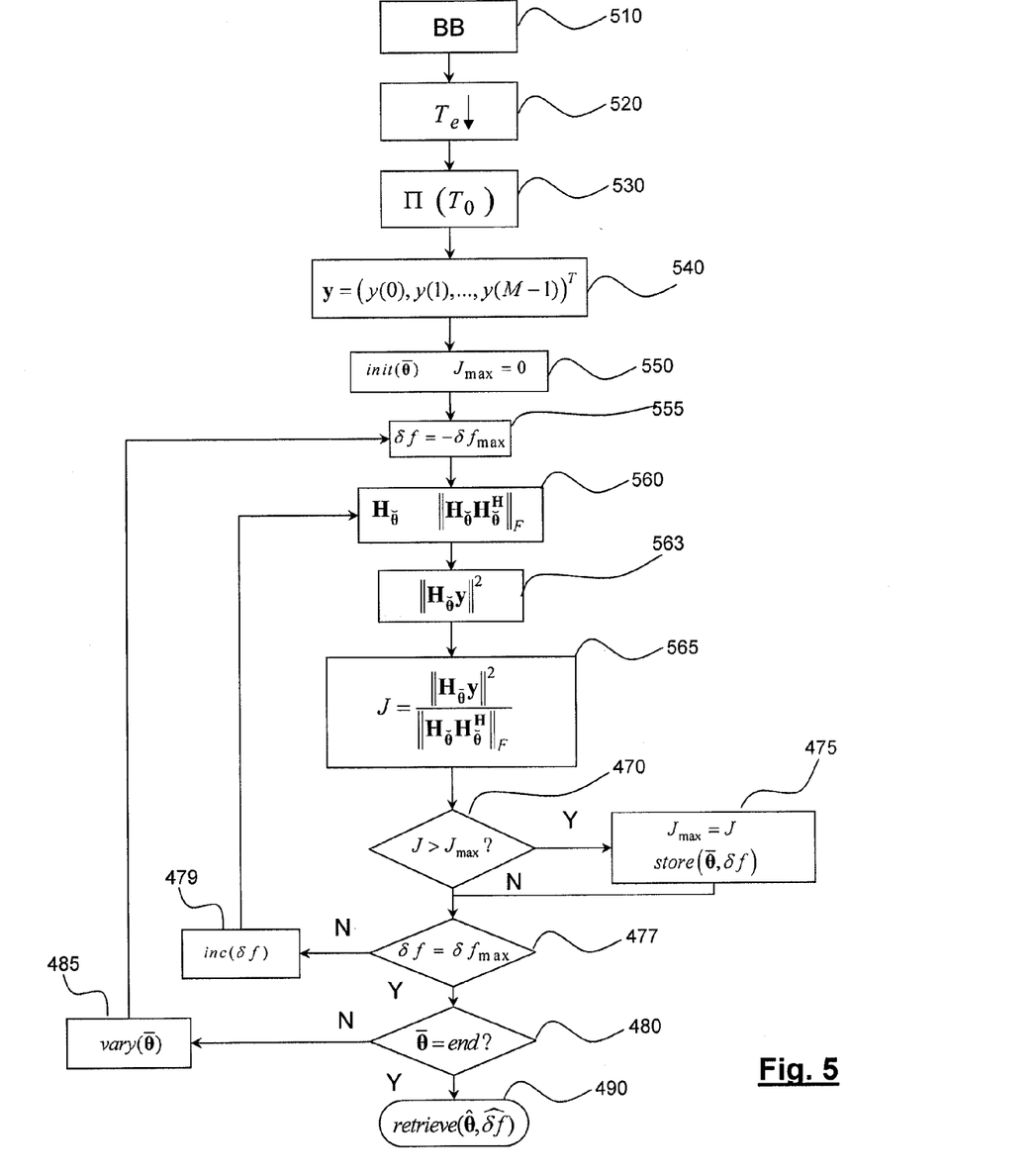
FIG. 5 is a flowchart of a method for estimating parameters of an OFDM signal according to a third embodiment of the invention.

FIG. 5 diagrammatically illustrates an OFDM parameter estimation method according to a third embodiment of the invention.

Steps 510 to 550 are identical to steps 310 to 350 of FIG. 3 and therefore will not be described again.

In step 555, the normalized frequency offset value is initialized, for example at a negative value $-\delta f_{max}$.

In step 560, the matrix $H_{\check\theta}$ is calculated using expression (17), then the Frobenius norm of $H_{\check\theta} H_{\check\theta}^H$.

In step 563, the Euclidean norm $\|H_{\check\theta}y\|^2$ is calculated.

Then in 565 the value J of the objective function is calculated from expression (18). If this value J is greater than the current value $J_{max}$, $J_{max}$ is updated to value J. The parameters $\bar\theta$ and the corresponding offset $\delta f$ are stored in memory.

In 577, one tests whether δ f has reached its maximum value $\delta f_{max}$ and if not, it is incremented, for example by 1/v, where v is a predetermined integer, before returning to matricial calculation step 560.

In the affirmative, one tests in 580 whether the entire range of parameters has been gone through. If this is not the case, the parameters $\bar\theta$ are modified in 585 and one returns to step 555 for a new initialization of the frequency offset.

However, if the range has been completely gone through, one ends with 590 by reading the offset $\delta f$ and the corresponding parameters $\bar\theta$ in memory. These values respectively provide the estimation $\hat{\Delta f} = \delta f/T_c$ of the offset and the estimation, $\hat\theta$, of the OFDM signal parameters.

One skilled in the art will understand that it is possible to combine the advantages of the second and third embodiments by jointly evaluating the temporal offset $\tau_e$ and the frequency offset δf.

Thus, according to a fourth embodiment, the set of parameters $\bar\theta$ both of the temporal offset $\tau_e$ and the frequency offset δf is increased, the set of parameters thus increased being denoted $\Theta = \bar\theta \cup \{\tau_e\} \cup \{\delta f\}$ and a new matrix $H_\Theta$ is defined taking into account both the phase rotations due to the frequency offset and the desynchronization due to the temporal offset. In other words, the matrix $H_\Theta$ is obtained by eliminating the $\tau_e$ first lines of the matrix $H_{\check\theta}$ defined by (17). The objective function is then defined:

$$J(\Theta) = \frac{\|H_\Theta^H y\|^2}{\|H_\Theta H_\Theta^H\|_F} \quad (19)$$

where it will be understood that the vector y appearing in (19), like that appearing in (16), has had its $\tau_e$ first components removed.

Here again it can be shown that $J(\Theta) \leq J(\theta) = \|H_\theta H_\theta^H\|_F$ and that the equality is only achieved if the parameters of the OFDM signal are correctly estimated and if the temporal and frequency offsets are also correct.

The implementation, not illustrated, of this fourth embodiment uses, like the second and third embodiments, an iterative loop making it possible to run through a range of parameters $\bar\theta$, but also second and third overlapping loops scanning the temporal offset interval, for example $[0, \tau_{max}]$, and the frequency offset interval, for example $[-\delta f_{max}, \delta f_{max}]$, the order of these two loops mattering little.

At the end of the scanning, the values of the parameters $\bar\theta$ and those of the temporal and frequency offsets $\tau_e$ and δf, achieving the maximum objective function, are read in the memory. They provide the estimation $\hat\theta$ as well as the estimation of the aforementioned offsets.

Figure 6:
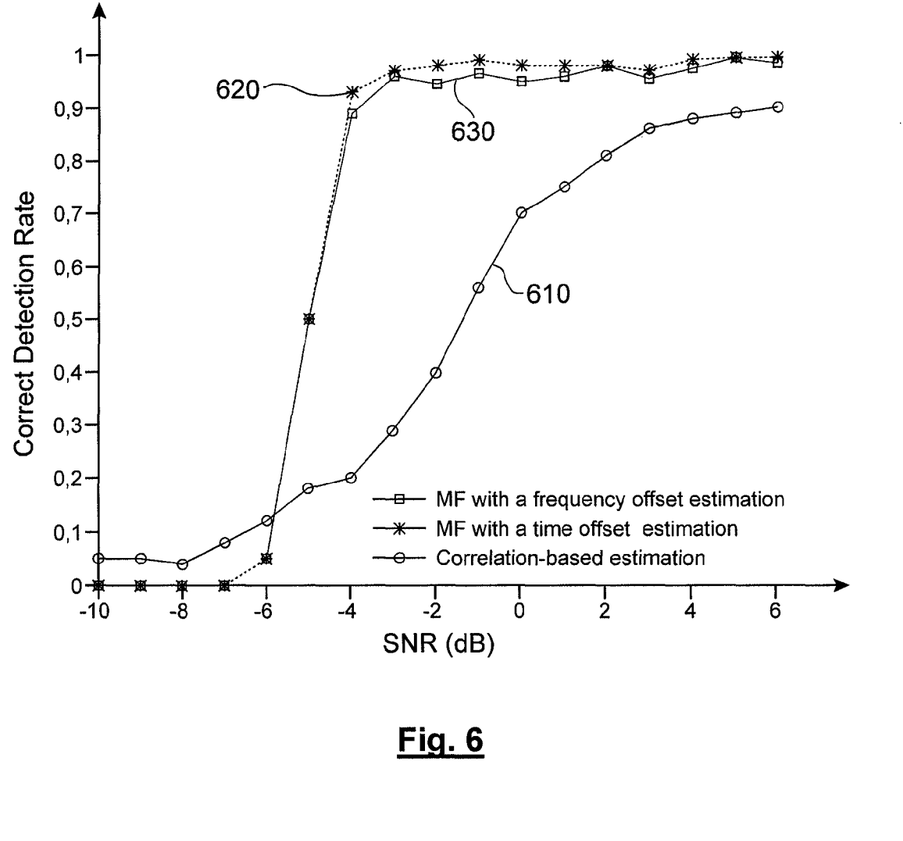
FIG. 6 illustrates the relative performance of a method for estimating an OFDM signal parameter according to the invention and an estimating method known from the prior art.

FIG. 6 shows the relative performance of different methods of an OFDM parameter (here the useful duration $NT_c$ of the OFDM symbols) in terms of correct estimation rate.

Curve 610 corresponds to an estimation method according to the prior art, using the auto-correlation function.

Curve 620 corresponds to an estimation method according to the second embodiment of the invention, i.e. taking the temporal offset into account. Curve 630 corresponds to an estimation method according to the third embodiment of the invention, i.e. taking the frequency offset into account.

It can be seen that once the signal to noise ratio is greater than −6 dB, the estimation methods according to the second or third embodiment of the invention provide substantially better results than those obtained using the estimation method according to the prior art.

The invention claimed is:

1. A method of blind estimation of at least one parameter of an OFDM signal comprising a sequence of OFDM symbols, the OFDM signal being baseband demodulated, then sampled during an observation period, the method comprising:
   forming a vector y of the samples thus obtained;
   building, for a plurality of possible values of the parameter ($\bar{\theta}$), a matrix $H_{\bar{\theta}}$ that is representative of an OFDM modulation used to generate the signal, the matrix depending on the parameter; and
   calculating the value of an objective function $$J(\bar{\theta}) = \frac{\|H_{\bar{\theta}}^H y\|^2}{\|H_{\bar{\theta}} H_{\bar{\theta}}^H\|_F},$$

where $\|.\|$ is the Euclidean norm, $\|.\|_F$ is the Frobenius norm, and wherein a parameter value that achieves the maximum of the objective function is selected among the possible values of the parameter, the parameter value thus selected providing the estimation of the parameter.

2. The method according to claim 1, wherein the parameter is characteristic of the useful length of the OFDM symbols.

3. The method according to claim 1, further comprising jointly estimate a set of parameters of the OFDM signal, the maximum of the objective function being sought for a set of respective possible values for the parameters, the set of the possible values achieving the maximum of the objective function yielding the respective estimated values of the parameters.

4. The method according to claim 3, wherein the set of parameters can be made up of the number (N) of sub-carriers of the OFDM multiplex, the useful length ($NT_c$), and the prefix duration ($DT_c$) of the OFDM symbols.

5. A method for the blind estimation of at least one parameter of an OFDM signal comprising a sequence of OFDM symbols, the OFDM signal being baseband demodulated, then sampled during an observation period, that the method comprising:
   forming a vector of the samples thus obtained;
   building, for a plurality of possible values of the parameter ($\bar{\theta}$), a matrix ($H_{\bar{\theta}}$) that is representative of an OFDM modulation used to generate the signal, the matrix depending on the parameter;
   testing, for each possible value of the parameter, a plurality of possible values for a temporal offset ($\tau$) between the beginning of the observation period and the beginning of an OFDM symbol, by eliminating, for each possible value of the temporal offset, a corresponding number of first lines of the matrix and the same number of first elements of the vector to form a truncated matrix $H_{\bar{\theta}}$ and a truncated vector y; and
   calculating the value of an objective function $$J(\bar{\theta}) = \frac{\|H_{\bar{\theta}}^H y\|^2}{\|H_{\bar{\theta}} H_{\bar{\theta}}^H\|_F},$$

where $\|.\|$ is the Euclidean norm, $\|.\|_F$ is the Frobenius norm, and in that, values of the parameter and offset that achieve the maximum of the objective function are selected among the possible values of parameter and temporal offset respectively, the values of parameter and temporal offset thus selected providing respectively the estimation ($\bar{\theta}$) of the parameter and the estimation of the temporal offset.

6. The method according to claim 5, wherein the parameter is characteristic of the useful length of the OFDM symbols.

7. The method according to claim 5, further comprising jointly estimating a set of parameters of the OFDM signal, the maximum of the objective function being sought for a set of respective possible values of these parameters and a value of the temporal offset, the set of the possible values of the parameters and the temporal offset achieving the maximum of the objective function yielding the respective estimated values of those parameters and that offset.

8. The method according to claim 7, wherein the set of parameters is made up of a number (N) of sub-carriers of the OFDM multiplex, a useful length ($NT_c$), a the prefix duration ($DT_c$) of the OFDM symbols.

9. A method for the blind estimation of at least one parameter of an OFDM signal comprising a sequence of OFDM symbols, the OFDM signal being baseband demodulated, then sampled during an observation period, the method comprising:
   forming a vector y of the samples thus obtained;
   building, for a plurality of possible values of the parameter ($\bar{\theta}$), a matrix ($H_{\bar{\theta}}$) that is representative of an OFDM modulation used to generate the signal, the matrix depending on the parameter as well as a frequency offset between the carrier of the OFDM signal and the frequency used to baseband demodulate it;
   testing, for each possible value of the parameter, a plurality of possible values of the frequency offset; and
   calculating the value of an objective function $$J(\bar{\theta}) = \frac{\|H_{\bar{\theta}}^H y\|^2}{\|H_{\bar{\theta}} H_{\bar{\theta}}^H\|_F},$$

where $\|.\|$ is the Euclidean norm, $\|.\|_F$ is the Frobenius norm, and values of the parameter and frequency offset that achieve the maximum of the objective function are selected among the possible values of parameter and frequency offset thus selected providing respectively the estimation ($\bar{\theta}$) of the parameter and as the estimation of the frequency offset.

10. The method according to claim 9, wherein the parameter is characteristic of the useful length of the OFDM symbols.

11. The method according to claim 9, further comprising jointly estimating a set of parameters of the OFDM signal, the maximum of the objective function being sought for a set of respective possible values of these parameters and a value of the frequency offset, the set of the possible values of the parameters and the frequency offset achieving the maximum of the objective function yielding the respective estimated values of those parameters and that offset.

12. The method according to claim 11, wherein the set of parameters comprises a number (N) of sub-carriers of the OFDM multiplex, a useful length ($NT_c$), and a prefix duration ($DT_c$) of the OFDM symbols.

* * * * *